US009764238B2

(12) United States Patent
Suh

(10) Patent No.: US 9,764,238 B2
(45) Date of Patent: Sep. 19, 2017

(54) APPARATUS AND METHOD FOR SERVICING USER PARTICIPATION-TYPE GAME BY USING REAL-TIME FLASH-MOB

(71) Applicant: SK PLANET CO., LTD., Seongnam-si, Gyeonggi-do (KR)

(72) Inventor: Bumjin Suh, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 71 days.

(21) Appl. No.: 14/571,620

(22) Filed: Dec. 16, 2014

(65) Prior Publication Data

US 2015/0196843 A1   Jul. 16, 2015

Related U.S. Application Data

(63) Continuation of application No. PCT/KR2013/007528, filed on Aug. 22, 2013.

(30) Foreign Application Priority Data

Oct. 31, 2012   (KR) ........................ 10-2012-0121894

(51) Int. Cl.
    *A63F 13/61* (2014.01)
    *A63F 13/63* (2014.01)
    (Continued)

(52) U.S. Cl.
    CPC ............ *A63F 13/63* (2014.09); *A63F 13/213* (2014.09); *A63F 13/61* (2014.09); *A63F 13/655* (2014.09); *A63F 13/79* (2014.09); *A63F 13/795* (2014.09)

(58) Field of Classification Search
    CPC ................................. A63F 13/63; A63F 13/21
    (Continued)

(56) References Cited

U.S. PATENT DOCUMENTS

2003/0003975 A1 *  1/2003  Lynn .................. G06Q 30/0277
    463/1
2003/0190954 A1 *  10/2003  Sitrick ................... A63F 13/00
    463/35
(Continued)

FOREIGN PATENT DOCUMENTS

KR    1020050110100 A    11/2005
KR    1020080001554 A    1/2008
(Continued)

OTHER PUBLICATIONS

Korean Office Action for application No. 10-2012-0121894 dated Jul. 28, 2014.
(Continued)

*Primary Examiner* — David L Lewis
*Assistant Examiner* — Shauna-Kay Hall
(74) *Attorney, Agent, or Firm* — Hauptman Ham, LLP

(57) ABSTRACT

The present invention relates to a system and method for servicing a user participation-type game, and more particularly, to a system and method for servicing a user participation-type game using real-time flash-mob, including: users that participate in the game are divided into creators or players, and different services are provided according to whether the user is a creator or a player; the creator registers instructions that have a specific theme and related images in order to induce the participation of other users (players), and the player reads the instructions and views images that are designated by the creator, and links similar images in order to achieve a real-time flash-mob; and the creator is compensated with points as more pictures are linked to one set of instructions, and the player is compensated with points as more links (participations) are made to the instructions of various creators.

11 Claims, 22 Drawing Sheets

(51) Int. Cl.
*A63F 13/213* (2014.01)
*A63F 13/79* (2014.01)
*A63F 13/655* (2014.01)
*A63F 13/795* (2014.01)

(58) Field of Classification Search
USPC ............................................... 463/31
See application file for complete search history.

(56) References Cited

U.S. PATENT DOCUMENTS

2008/0189609 A1* 8/2008 Larson .................. G06F 17/211
715/273
2008/0250449 A1* 10/2008 Torkos .................. G06Q 30/02
725/34
2009/0023496 A1* 1/2009 Kataoka .............. G07F 17/3211
463/31
2011/0256933 A1* 10/2011 Place ...................... A63F 13/12
463/42
2012/0021829 A1* 1/2012 Shoham ................ A63F 13/332
463/31

FOREIGN PATENT DOCUMENTS

| KR | 1020080006284 A | 1/2008 |
| KR | 1020080041905 A | 5/2008 |
| KR | 1020110069985 A | 6/2011 |
| KR | 1020120014822 A | 2/2012 |

OTHER PUBLICATIONS

International Search Report for PCT/KR2013/007528 dated Dec. 2, 2013.

* cited by examiner

APPARATUS AND METHOD FOR SERVICING USER PARTICIPATION-TYPE GAME BY USING REAL-TIME FLASH-MOB

TECHNICAL FIELD

Disclosed are a system and method for servicing a user-participation type game, and more particularly, a system and method for servicing a user-participation type game capable of increasing interest of participants and being used for advertisement by dividing a game mode into a create mode and a play mode such that each user suggests an instruction having a specific theme and a related image in the create mode, and in the play mode, each user links a similar image with respect to the instruction and related image suggested in the create mode, so that an online flash-mob is achieved.

BACKGROUND ART

With a rapid increase in Internet penetration, various types of services have been provided via the Internet.

In particular, a game service is one that many users access among online services provided via the Internet, and services various games. In addition, game services have been developed to have mechanisms allowing users to enjoy various types of multimedia content even in a virtual world of an online game. In addition, mechanisms allowing not only a single user but also other users to participate in a game and enjoy the game together have also been under development in game services.

Meanwhile, a method for a user to provide other users with multimedia content through a user terminal such as a personal computer is mainly achieved using a specific web site, a private homepage or a blog. That is, a user connects to the Internet and uploads a desired multimedia file through a web page or the user's online community or blog, which other users visit to share the multimedia content through streaming replay, download or comments.

However, such a conventional method only provides one-way multimedia content according to each user's preference, and fails to provide variety in linkage with other users. For example, in an online community entitled 'preparing food using a specific ingredient or a specific theme,' each user suggests his or her own multimedia content, but in order to view other user's multimedia content, there is a need to repeat a process including: selecting a desired user from a list and moving to the corresponding web page to view the content, and then returning to the previous page or selecting another user from the list.

Accordingly, the conventional method does not ensure connection with other user's multimedia content, and has the inconvenience of repeatedly selecting, viewing and returning, which may become tedious to a user.

The present invention is provided to overcome these problems of a fragmentary multimedia content service, and allow users to enjoy variety in a game in which a user can view other user's multimedia content while sharing his or her own multimedia content with other users.

DISCLOSURE

Technical Problem

The present invention provides a system and method for providing a user-participation type game service capable of increasing interest in a game by implementing an online flash-mob when a user participating in a game registers an instruction having a specific theme and an image as a creator and other users participate in the game by linking similar images with respect to the registered instruction and image.

The present invention provides a system and method for providing a user-participation type game service capable of being used as an Open Product PLacement (PPL) advertisement by inserting a brand logo, an actual product based stamp or a stamp for a campaign and promotion at a designated position of an image and producing the image having the stamp inserted therein when a creator or a player registers or links an image.

The present invention provides a system and method for providing a user-participation type game service capable of maintaining continuous interest and attention of users by providing game points and actual rewards associated with a stamp based on the degree of user participation as a creator or a player or the degree of use of the stamp, and further capable of raising a profit by adopting a charging system.

Technical Solution

According to a first aspect of the present invention, there is provided an apparatus for servicing a user-participation type game utilizing a real-time flash-mob, the apparatus including: a game service providing unit configured to guide a user to select a create mode or a play mode prior to execution of a game service, and allow the user to register an instruction having a specific theme and a related image for the instruction in the create mode, and link a similar image in the play mode after viewing a user-specific instruction and a user-specific related image that are designated in the create mode, thereby implementing a flash-mob; and an image photographing unit configured to acquire an image of a subject when image photography is requested during the image registration or the image linking in the game service providing unit, and convert the acquired image into an electric signal.

According to a second aspect of the present invention, there is provided a terminal apparatus including: an image photographing unit configured to acquire an image of a subject, and convert the acquired image into an electric signal; an image recording unit configured to record an image acquired by the image photographing unit or an image received from outside; an input unit configured to select an image acquired by the image photographing unit or an image pre-stored in the image recording unit, and receive a manipulation signal to link the selected image; and a service providing unit configured to guide a user to select a create mode or a play mode prior to execution of a game, and allow the user to register an instruction having a specific theme and a related image for the instruction by receiving the instruction and image from the input unit in the create mode and in the play mode, select an instruction for participation after viewing a user-specific instruction and a user-specific related image that are designated in the create mode, acquire a similar image with respect to the selected instruction through the image photographing unit or the image recording unit, and link the acquired image to the selected instruction.

According to a third aspect of the present invention, there is provided a method of servicing a user-participation type game using a real-time flash-mob, the method including: performing, by a game service apparatus, user authentication through membership login; guiding, by the game service apparatus, a user authenticated through the user authentication to select one of a play mode or a create mode prior to execution of a game; and performing, by the game service apparatus, a create process in which a user-specific instruction having a specific theme and a user-specific related image are registered when the create mode is selected, and performing, by the game service apparatus, a play participation process in which an instruction for user participation is selected among user-specific instructions and user-specific related images that are designated in the create mode, a similar image with respect to the selected instruction is received and the received similar image is linked to the selected instruction when the play mode is selected.

Advantageous Effects

According to the above-described aspects of the present invention, a flash-mob is implemented in the form of a game through a user terminal, that is, a mobile terminal, in a manner in which an instruction and an image designated by a creator are viewed and similar images are linked to participate in a game, thereby providing a user-participation type game capable of increasing interest of participants in a game.

In addition, a brand logo, an actual product based stamp or a stamp for a campaign and promotion is inserted into an image of a creator or a player such that the stamp is shared and transmitted to many users, thereby being utilized as an open product placement (open PPL) advertisement. In addition, the degree of user participation is statistically identified based on the degree of use of the stamp, which is thus utilized for advertisement analysis and prediction of advertisement effect.

In addition, images linked with respect to an instruction designated by a creator are edited into a moving image and provided, thereby maximizing the advertisement effect for an advertiser.

In addition, a user having a higher degree of participation as a creator or a player is given game points, a discount coupon, a free coupon, or is subject to a payment system using points or an actual reward, thereby producing a secondary advertisement effect and effectively increasing the participation of users.

MODE FOR INVENTION

Hereinafter, exemplary embodiments of the present invention will be described in detail with reference to the accompanying drawings. The configuration and effects thereof will become readily apparent with reference to the following detailed description when considered in conjunction with the accompanying drawings. In the following description and accompanying drawings, detailed description of functions and configurations that are widely known in the art and may make essential points of the present invention obscure are omitted. Like numbers refer to like elements throughout the description of the figure.

A flash-mob described in the present invention represents an assembly or act in which unspecified people gather on a designated date and at a designated time and place that are set through e-mails and text messages of cellular phones, perform an appointed act and disperse as if nothing had happened.

Utilizing characteristics of such a flash-mob, the present invention provides a configuration to collect multimedia content, such as text, audio, pictures (or photos or images), moving images (or videos) of following an appointed act or behavior online rather than offline, and enable many people to enjoy the collected multimedia content in the form of a game.

Figure 1:
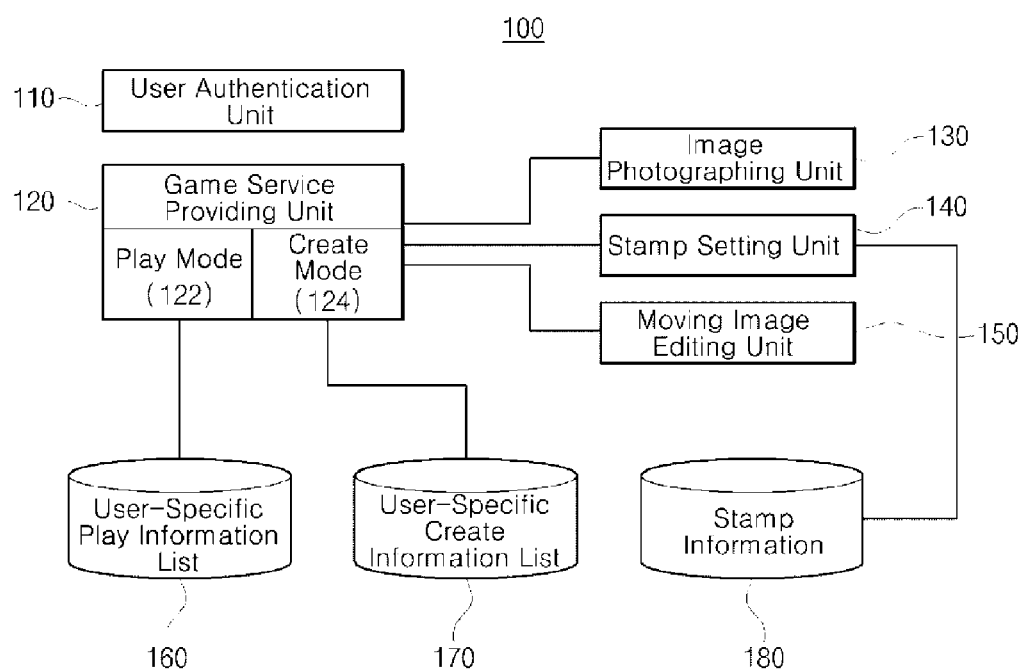
FIG. 1 is a view illustrating a configuration of a game service apparatus according to an embodiment of the present invention.

FIG. 1 is a view illustrating a configuration of a game service apparatus according to an embodiment of the present invention.

The game service apparatus 100 according to an embodiment of the present invention includes a user authentication unit 110, a game service providing unit 120, an image photographing unit 130, a stamp setting unit 140, and a moving image editing unit 150.

The user-authentication unit 110 performs user authentication based on authentication information about members who have signed in to a game service. The user authentication unit 110 may be omitted or added depending on a policy of the game service. For example, when anonymous access and service provision are available, the user authentication may not be performed.

In addition, the user authentication unit 110 may internally store authentication information about members, and perform authentication by itself. Alternatively, the user authentication unit 110 may perform authentication in conjunction with an external subscriber server storing authentication information about members.

The image photographing unit 130, the stamp setting unit 140 and the moving image editing unit 140 perform operations under the control of the game service providing unit 120.

That is, the image photographing unit 130 acquires an image of a subject, and converts the acquired image into an electric signal if image photography is requested when a photo or a moving image (hereinafter referred to as an image) is registered and linked through a play mode 122 and a create mode 124 that are provided by the game service providing unit 120. As described above, not only an image (a photo or a moving image) but also multimedia content, such as text and audio, may be used. However, for convenience sake of description, the following description will be made in relation to an image (a photo or a moving image).

The stamp setting unit 140 manages stamp information based on a brand logo, an actual product and a promotion, and provides any one selected from among the stamp information when an image is registered or linked by the game service providing unit 120 such that the stamp information is inserted at a designated position of the image and the image having the stamp information inserted therein is produced. The stamp information may include a brand logo having a specific logo, such as 'Starbucks,' Adidas' or 'Burger King,' a thumbnail image based on an actual product (hereinafter referred to as an item), and a text phrase for a campaign or promotion, for example, 'save nature' or 'use public transportation.' Such stamp information is pre-stored in a DB 180.

The moving image editing unit 150 collects images linked by other users with respect to an instruction registered through the create mode 124 of the game service providing unit 120, and edits the collected images into a moving image. If the creator is an advertiser, the moving image editing unit 150 may edit images related to its company's advertisement in the form of a moving image such that the moving image is utilized for an advertisement later.

For example, an advertiser 'Adidas' suggests an instruction 'run,' and each user photographs an image of himself or herself running through the play mode and links the image, and the moving image editing unit 15 collects the images to generate an advertisement video showing a people running, thereby producing the effect of an advertisement effect in which many users can participate.

The game service providing unit 120 guides a user to select one of a play mode 122 and a create mode 124 on a screen prior to execution of a game service, and provides a different service depending on the selected mode.

That is, in the create mode 124, the game service providing unit 120 is provided such that a user registers an instruction having a specific theme and a related image. In this case, a user participating in the create mode 124 may be referred to as a creator.

In the play mode 122, the game service providing unit 120 guides each user to select an instruction with respect to which he or she will participate from among the instructions and the related images that are registered in the create mode, and a similar image with respect to the selected instruction is acquired from the image photographing unit 130 or pre-stored data, and linked to the selected instruction. In this case, the user participating through the play mode 122 is identified as a player.

Creators and players are discriminated in order to differentially provide points depending on their role in the game service. That is, high participation as a player is distinguished from high participation as a creator. A user may be a player or a creator at the same time.

In addition, when an image is registered or linked in the play mode 122 and the create mode 124, the game service providing unit 120 may be provided to photograph a desired image in conjunction with the image photographing unit 130, and if a desired image is pre-stored, may be provided to retrieve the desired image from a pre-storage space (for example, a gallery).

In addition, the game service providing unit 120 determines that more images linked with respect to a user-specific instruction suggested in the create mode 124, or more links made by a player in the play mode 122 represents high participation, and provides a user with high participation with a differential reward. When selecting a high participation user, only one user having the highest participation in the position of a creator or a player may be selected, or several users ranked behind the top user (for example, the top three, the top five or the top ten) may be selected. In addition, when providing a reward, all the selected users may be given the same reward, or rewards may be given according to a rewarding system of differentially rewarding based on the ranking.

In addition, the game service providing unit 120 is provided such that the most similar or interesting image is selected among a predetermined number of linked images and recommended as the best image in the create mode 124. In this case, the game service providing unit 120 assigns a top ranking referred to as 'best popster' to a user (a player) recommended as having the best image, and additionally provides a differential reward to the user.

In addition, the game service providing unit 120 checks the degree of use of the stamp inserted by the stamp setting unit 140, for example, to provide the corresponding user with an actual reward associated with the stamp upon reaching a predetermined number of uses.

A user-specific play information list 160 stores images input in the play mode 122 of the game service providing unit 120 together with instructions linking the input images such that the images and the instructions match each other. In addition, the user-specific play information list 160 may store profile information about the ranking and points assigned to each user as a player. In addition, if there is an image selected by the creator as the best image among images linked by users, the user-specific play information list 160 may further store information about the image selected as the best image.

Accordingly, when the play mode 122 is executed through the game service providing unit 120, the game service providing unit 120 retrieves data stored in the user-specific play information list 160, and visually displays the ranking of each user, the points of each user, the images linked by each user and the best image selected by the creator, on the screen.

A user-specific create information list 170 stores user-specific instructions and related images, which are input in the create mode 124 of the game service providing unit 120, together with images linked to the user-specific instructions such that the user-specific instructions and related images match the linked images. Accordingly, when the create mode 124 is executed through the game service providing unit 120, the game service providing unit 120 retrieves data stored in the user-specific create information list 170, and visually displays instructions of each creator, related images of each user and linked images of players, on a screen.

Each element of the game service apparatus may be implemented through a plurality of servers or a plurality of apparatuses or in a stand-alone form configured in a single terminal.

Figure 2:
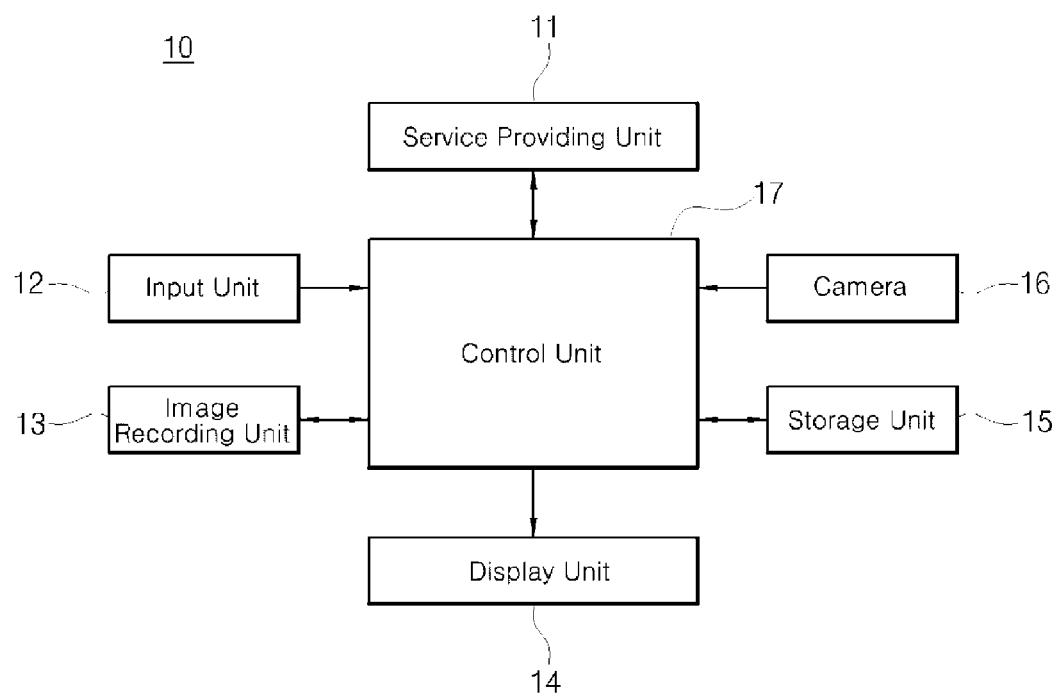
FIG. 2 is a view illustrating a mobile device to which a game service apparatus according to an embodiment of the present invention is applied.

For example, FIG. 2 is a view illustrating a mobile device to which a game service apparatus according to an embodiment of the present invention is applied. According to the configuration shown in FIG. 2, the present invention can implement a real-time flash-mob through a mobile device.

The mobile device 100 may basically include an input unit 12, an image recording unit 13, a display unit 14, a storage unit 15, a camera 16, a control unit 17 and a service providing unit 11.

The image recording unit 13, the display unit 14, the storage unit 15, the camera 16 and the control unit 17 may be configured in the mobile device 10.

The input unit 12 generates manipulation signals to select a game mode provided by the service providing unit 11, register an image through a mode selection, link an image and select a stamp. The input unit 12 may be composed of a plurality of buttons or a key pad. In addition, the input unit 12 may be integrally formed with the display unit 14 when the display unit 14 has a touch pad attached thereto or is provided in the form of a touch screen. In particular, when the mobile device 10 is composed of a full touch screen, such as a full touch phone, a smart phone, and a tablet PC, the input unit 12 performs an input operation through a user's touch.

The camera 16 photographs an image according to a request from the service providing unit 11.

The storage unit 15 temporarily buffers the image photographed through the camera 16. That is, an electric signal output from the camera 16 is subjected to image processing in the control unit 17, and then buffered in the storage unit 15. The storage unit 15 may be allocated in a volatile memory, such as a random access memory (RAM).

The image recording unit 13 records an image temporarily buffered in the storage unit 15 or an image received from an external device. In general, the image recording unit 13 represents a gallery in the mobile device 10.

The display unit 14 displays an image photographed by the camera 16 or an image pre-stored in the image recoding unit 13, and displays a screen executed through the service providing unit 11. The display unit 14 may be composed of a display device, such as a liquid crystal display (LCD) or light emitting diode (LED).

The control unit 17 controls the overall operation of each element of the mobile device 10, and drives the camera 16, sends the display unit 14 an image, or transmits a manipulation signal of the input unit 12 to the service providing unit 11 according to a request from the service providing unit 11.

The service providing unit 11 performs a game service providing function including operations of the user authentication unit 110, the game service providing unit 120, the stamp setting unit 140 and the moving image editing unit 150 shown in FIG. 1. In this case, if an image needs to be photographed when an image is registered or linked according to a game mode, the service providing unit 11 sends the camera 16 a request for photography, and acquires the photographed image from the image recording unit 13 or the storage unit 15.

The above described operation has been described as being performed based on hardware configuration in the mobile device, but may be implemented and executed in a software program or may be implemented in an application. Detailed functions of the game service that have not been described above are the same as in the configuration of the game service apparatus shown in FIG. 1, and thus omitted.

Hereinafter, based on the above configuration, a method of providing a game service will be described in detail in relation to a user interface screen as an example.

Figure 3:
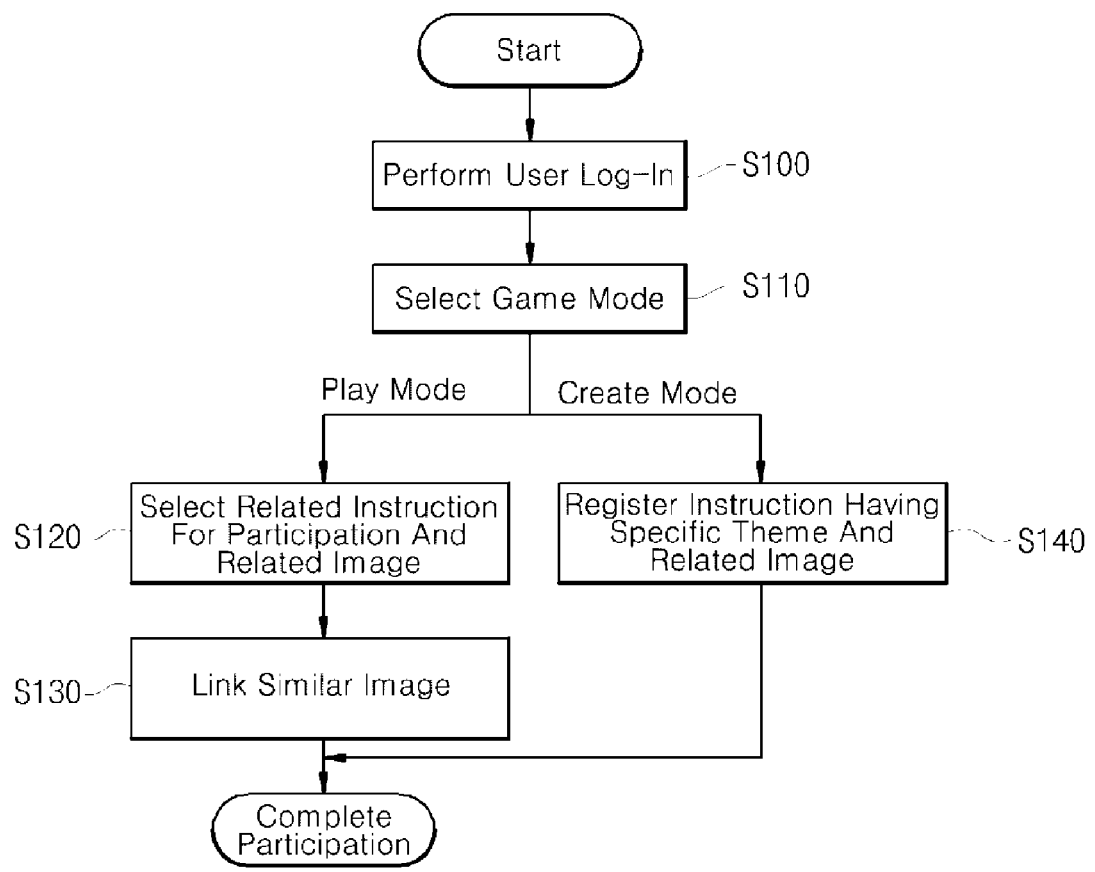
FIG. 3 is a flowchart schematically showing a game servicing method according to an embodiment of the present invention.
Figure 4:
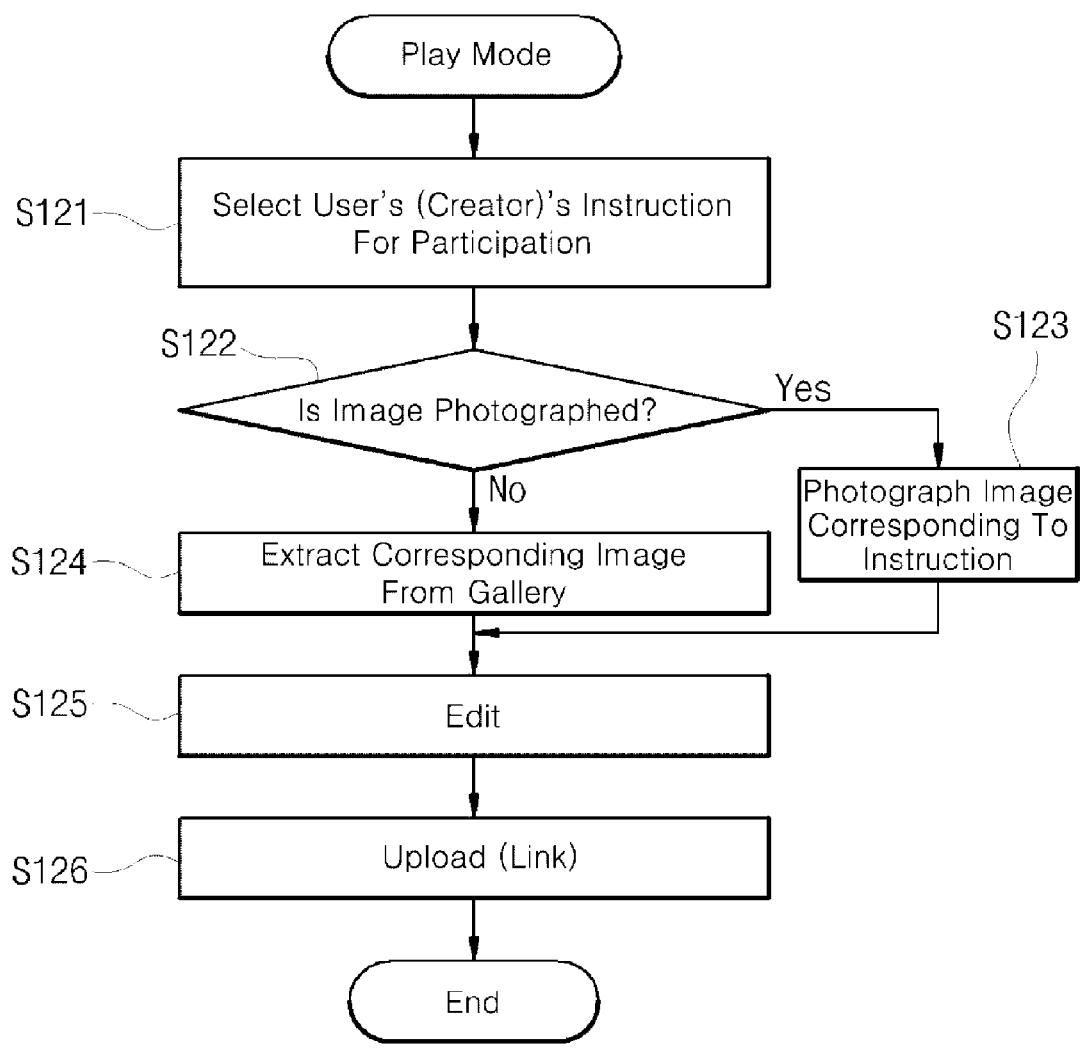
FIGS. 4 and 5 are flowcharts showing a game servicing method in a play mode and a create mode of FIG. 3, respectively.
Figure 5:
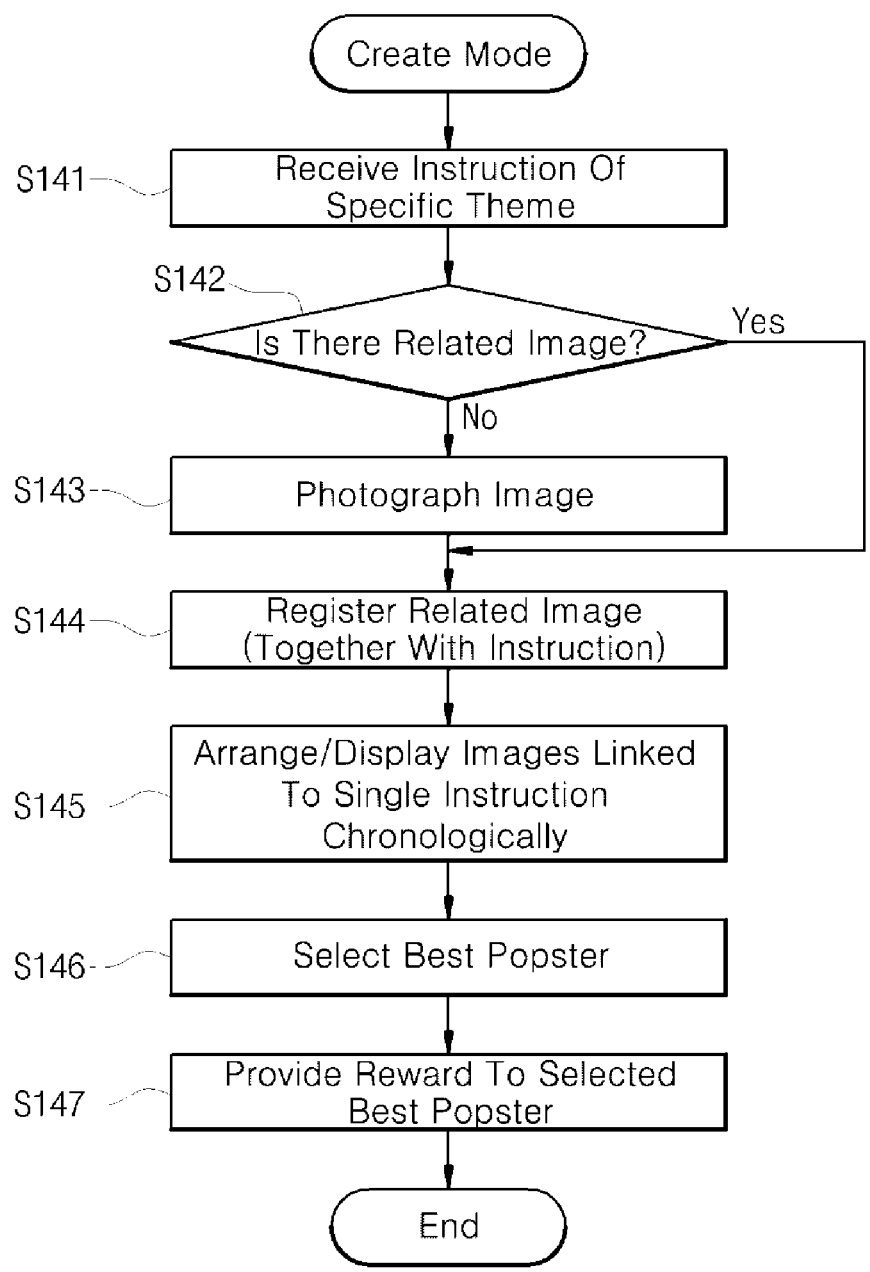

FIG. 3 is a flowchart schematically showing a game servicing method according to an embodiment of the present invention, and FIGS. 4 and 5 are flowcharts showing a game servicing method in a play mode and a create mode of FIG. 3, respectively.

Referring to FIG. 3, the game service apparatus according to an embodiment of the present invention performs user authentication based on authentication information of members that is input through membership login (S100).

The user authentication process (S100) may be omitted when anonymous access is possible according to the policy of a game service, but basically, it may be assumed that only a user authenticated through the login receives a service.

After the authentication, the game service apparatus provides a screen guiding a user to select a game mode on the screen (S110). The game mode is divided into a play mode in which a user passively participates in a game by linking an image, and a create mode in which a user actively suggests an instruction having a theme of a specific campaign or promotion and a related image to induce participation of other users in the game.

When a user selects a play mode, the game service apparatus displays profile information about a user who is a player as an initial screen. The profile information about a user who is a player may include the ranking of the user as a player, the points of the user and images linked by the user. In particular, the linked image may be displayed in a lattice form list, or may be displayed along a periphery of a disc form list. Details thereof will be described later with reference to the accompanying UI screens.

Thereafter, the game service apparatus receives a selection regarding an instruction with respect to which each user will participate among instructions and user-specific related images (S120).

The game service apparatus receives a similar image with respect to the instruction selected by a user, and links the received similar image to the instruction (S130).

Figure 13:
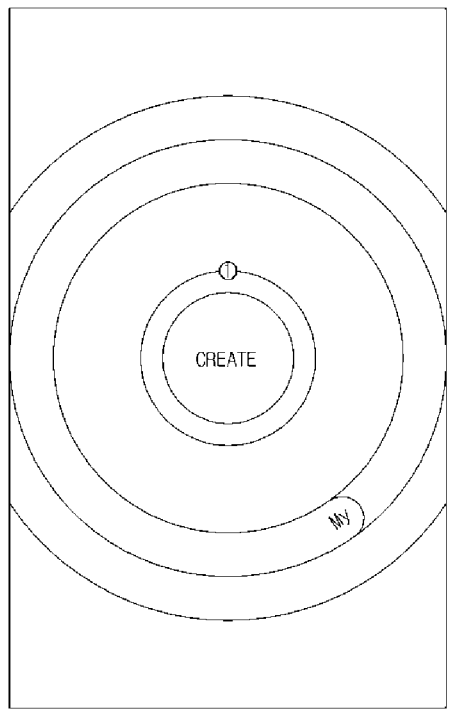
FIGS. 13 and 14 are UI screens showing a game service in a create mode according to an embodiment of the present invention.
Figure 14:
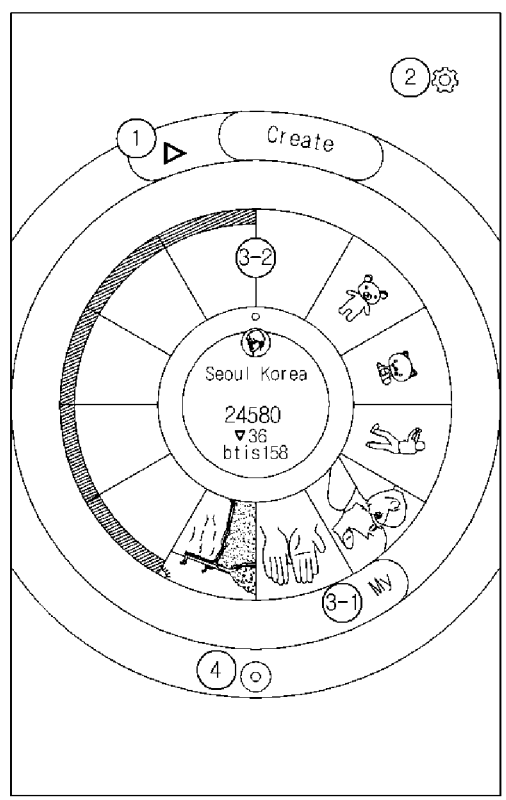

When a user selects a create mode, the game service apparatus enters a create mode as shown in FIGS. 13 and 14, and displays profile information 13 about a user in the position of a creator as an initial screen. The profile information 3, including a profile image, location, ranking and point drop of a user as a creator, is displayed at the center of a circle, and the instructions and related images 3-2 registered by the user are displayed along the periphery of the circle. The outermost periphery includes a display area 1 indicative of a create mode and an image photography button 4, and in addition, the initial screen may further include a setting menu 2 of the create mode. In addition, if the ranking is manipulated in up and down directions on the initial screen, the initial screen displays profile information and created instructions and related images of other creators corresponding to the manipulated ranking.

Thereafter, the game service apparatus may serve to register an instruction having a specific theme and a related image according to a request from a user, or recommend the best image among images linked to each instruction.

Thereafter, the game service apparatus may select a user having a high degree of participation in the create mode or the play mode, and provide the selected user with game points. To determine a participation level, a user having more images linked with respect to each instruction in the create mode, and a user who has made more links with respect to each instruction in the play mode 122 are determined as high participation users.

Meanwhile, a game in the play mode is performed as shown in FIG. 4. For convenience of understanding, detailed screens according to each process are described with reference to FIGS. 9 to 12E.

Figure 9:
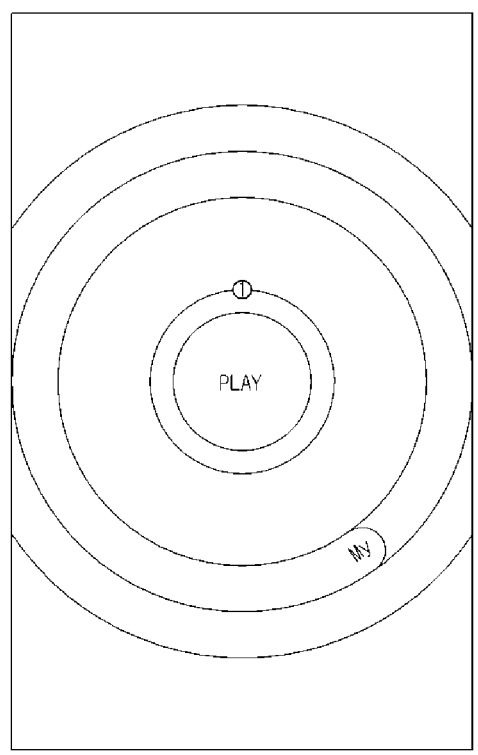
FIGS. 9, 10, and 11A to 11C are UI screens showing a game service in a play mode according to an embodiment of the present invention.

FIG. 9 is a view showing a UI screen before entering a play mode.

Figure 10:
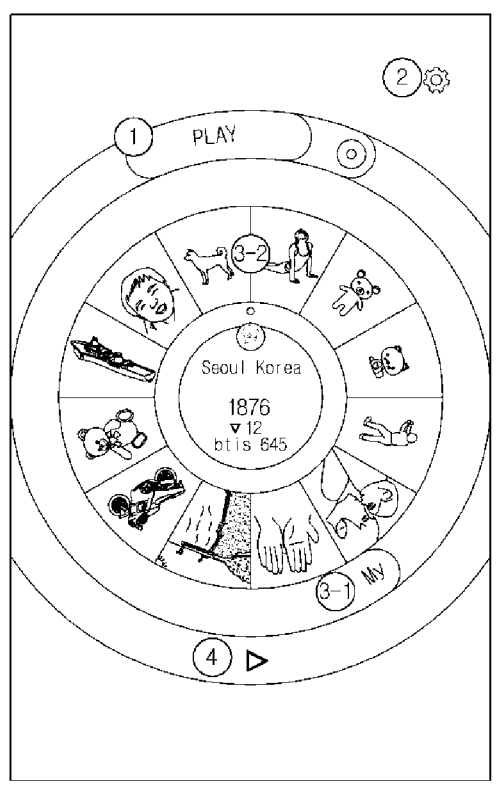

When a play button 1 is selected on a screen of FIG. 9 to enter a play mode, the game service apparatus displays play information about a user on the main first page as shown in a screen of FIG. 10.

Reference numeral 1 in FIG. 10 denotes a menu area showing the current mode state, and if a 'play button' is flicked to the right, the play mode is changed to a create mode screen. Reference numeral 2 in FIG. 10 denotes a setting menu button configured to set a play mode, and reference numeral 3 denotes profile information about a user. The profile information about a user may include a profile image, location (a region), ranking, points, and ranking drop. Reference numeral 3-2 denotes a display area configured to identify a history by arranging user-participation images chronologically. The area 3-2 is displayed in an empty state if there is no play image of a user participating, and is provided in the form of a round scroll if there are more than a predetermined number of images of a user participating so that a plurality of images may be displayed on the area 3-2. Reference numeral 3-1 denotes a MY button. Upon selection of the MY button 3-1 while the user's own play information is being displayed, a refresh is performed, and upon selection of the MY button 3-1 while other users' play information is being displayed, the main first page is shifted to and the user's own play information is shown. Reference numeral 4 denotes an image photography button.

Figure 11A:
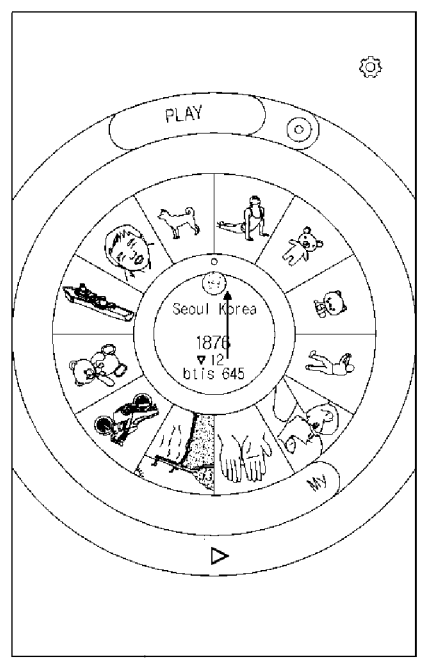
Figure 11B:
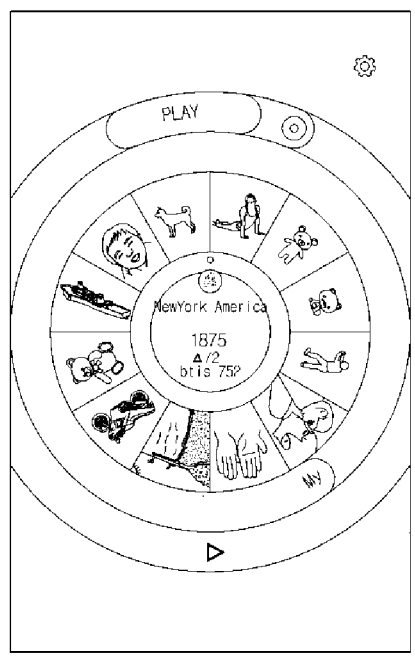
Figure 11C:
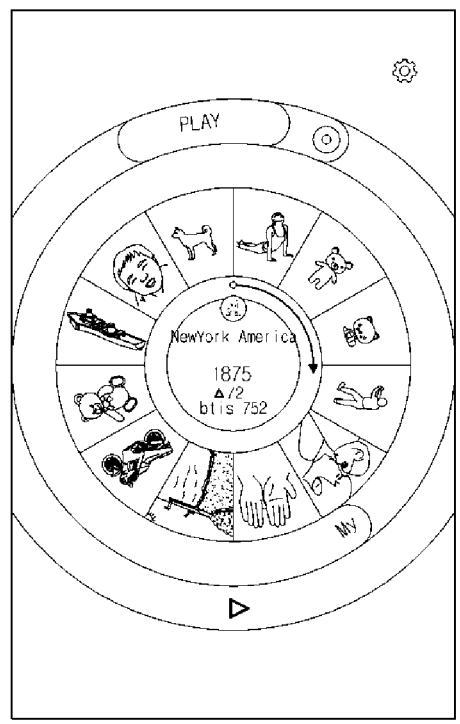

On the above-described main play screen, the game service apparatus may display play information about other users (players) according to a manipulation (a request) of the user. For example, if a ranking displaying area shown in FIG. 11A is scrolled in the up and down directions, the ranking indication is changed and profile information about a user corresponding to the changed ranking is displayed as shown in FIG. 11B. In addition, by rotating a ranking dial as shown in FIG. 11C, the ranking may be referred to starting from a user ranked first. According to the present invention, a user who desires to view profile information about other users may manipulate the ranking displaying area or passively access users listed in the order of recent dates or popularity, rather than searching for a specific user, such as through an Internet search.

Figure 12A:
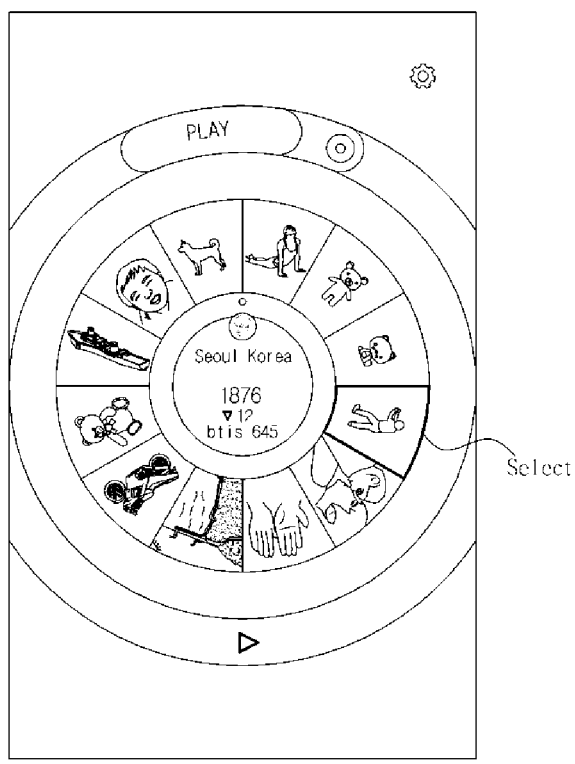
FIGS. 12A to 12E are UI screens showing a servicing method in a play mode of a game servicing method of FIG. 3 in stages.
Figure 12B:
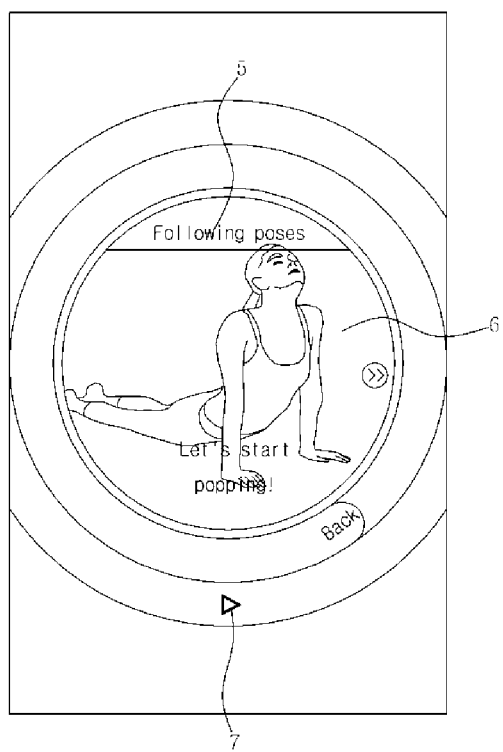

When a user selects an instruction among instructions registered by a plurality of users as shown in FIG. 12A, the game service apparatus receives the selection and thus enters a game participation mode (see FIG. 12B) (S121). Reference numerals 5 and 6 in FIG. 12B denote areas displaying an instruction selected by a user and a related image, respectively.

Thereafter, when a user performs an input on the image photography button (see 7 in FIG. 12B), the game service apparatus activates a camera, and photographs an image according to the instruction (S122 and S123).

Figure 12C:
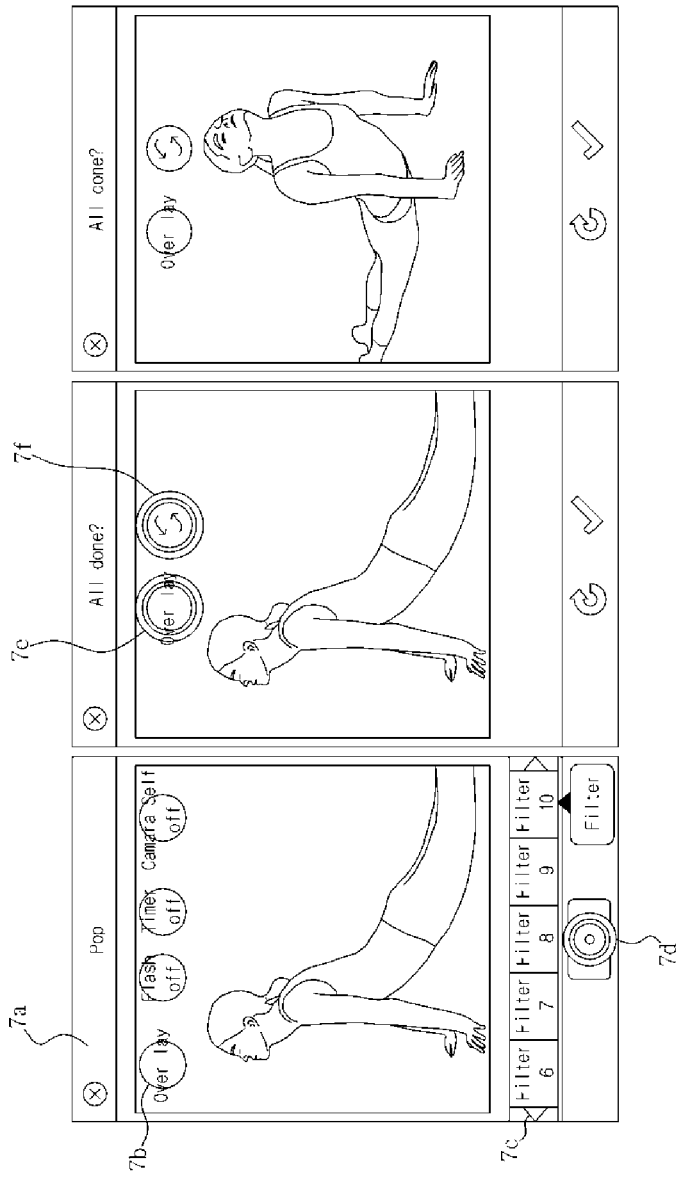

An example of photography is shown in FIG. 12C.

That is, as the camera is activated, a photography scene is displayed on the screen, and various menus 7b and 7c required for photography are displayed. Reference numeral 7b denotes a camera setting function menu, which includes an overlay menu showing spectra of an image registered by a creator, a flash setting menu, a timer setting menu and a camera self menu. Reference numeral 7c denotes a menu configured to apply a filter effect to an image before or after photography. Reference numeral 7a denotes a camera tile area, which includes a minimum function. Reference numeral 7d denotes a camera button.

When an image is photographed through the camera button 7d, the original scene is shifted into a picture review scene, which may include an overlay menu 7e and a rotation menu 7f.

Thereafter, if an image is selected by a user from a gallery (or an image recording unit) in addition to a request for image photography by a user as shown in FIG. 4, the game service apparatus extracts the image selected by the user (S124).

Thereafter, the game service apparatus edits the image acquired through the photography or the image extracted from the gallery (S125). The editing process may include rotation, a filtering effect, enlargement, reduction, and stamp insertion. The stamp insertion process will be described in detail with reference to FIGS. 7 and 8 later.

Figure 12D:
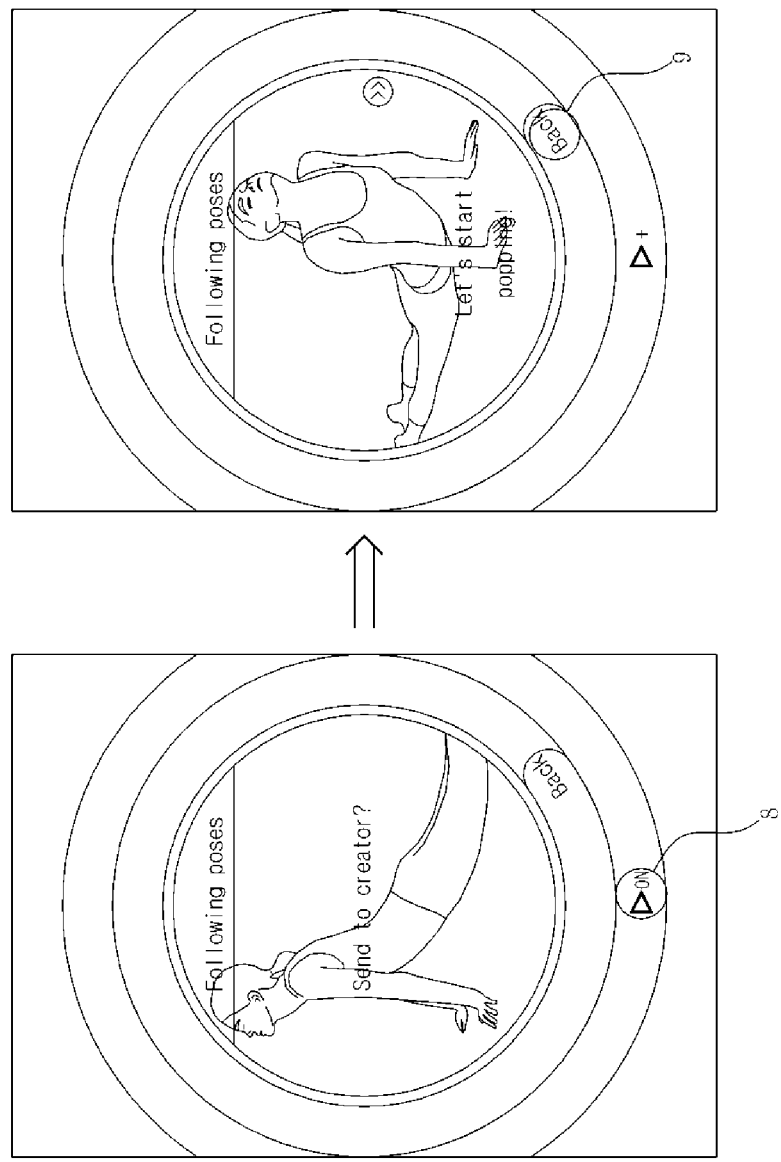

Thereafter, as shown in FIG. 12D, the game service apparatus uploads the edited image, and links the image to the corresponding instruction.

Reference numeral 8 in FIG. 12D denotes a button for finally submitting the image of the user participating, and reference numeral 9 denotes a button used to return to a play random screen to participate in a play mode after finally submitting the image of the user participating.

Figure 12E:
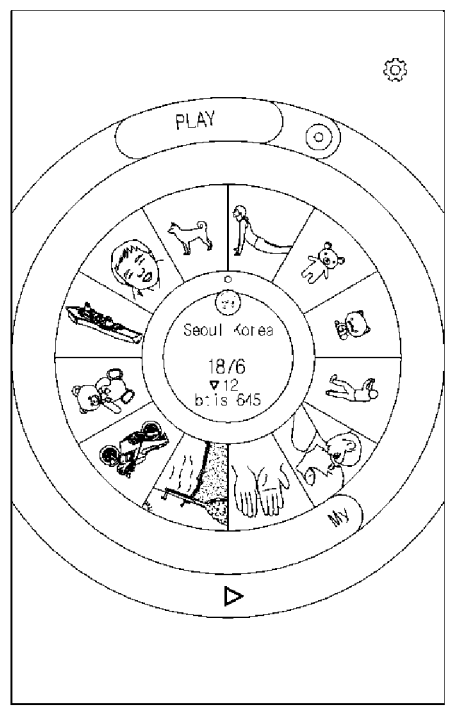

As shown in FIG. 12E, the image of recent participation (see a dotted circle) is exposed on the uppermost portion of the main first page of the user who has completed participation.

As described above, the play mode according to the present invention suggests a method of finding unspecified creators or unspecified instructions based on an anonymous service by moving the ranking area up or down or rotating it in a certain direction, and participating. However, if necessary, the play mode may adopt a method of directly selecting a specific creator, a specific theme or instruction through searching, and participating.

In addition, change may be made in the positions and sizes of the configuration of UI screens shown in FIGS. 9 to 12E for the user's convenience.

Figure 15:
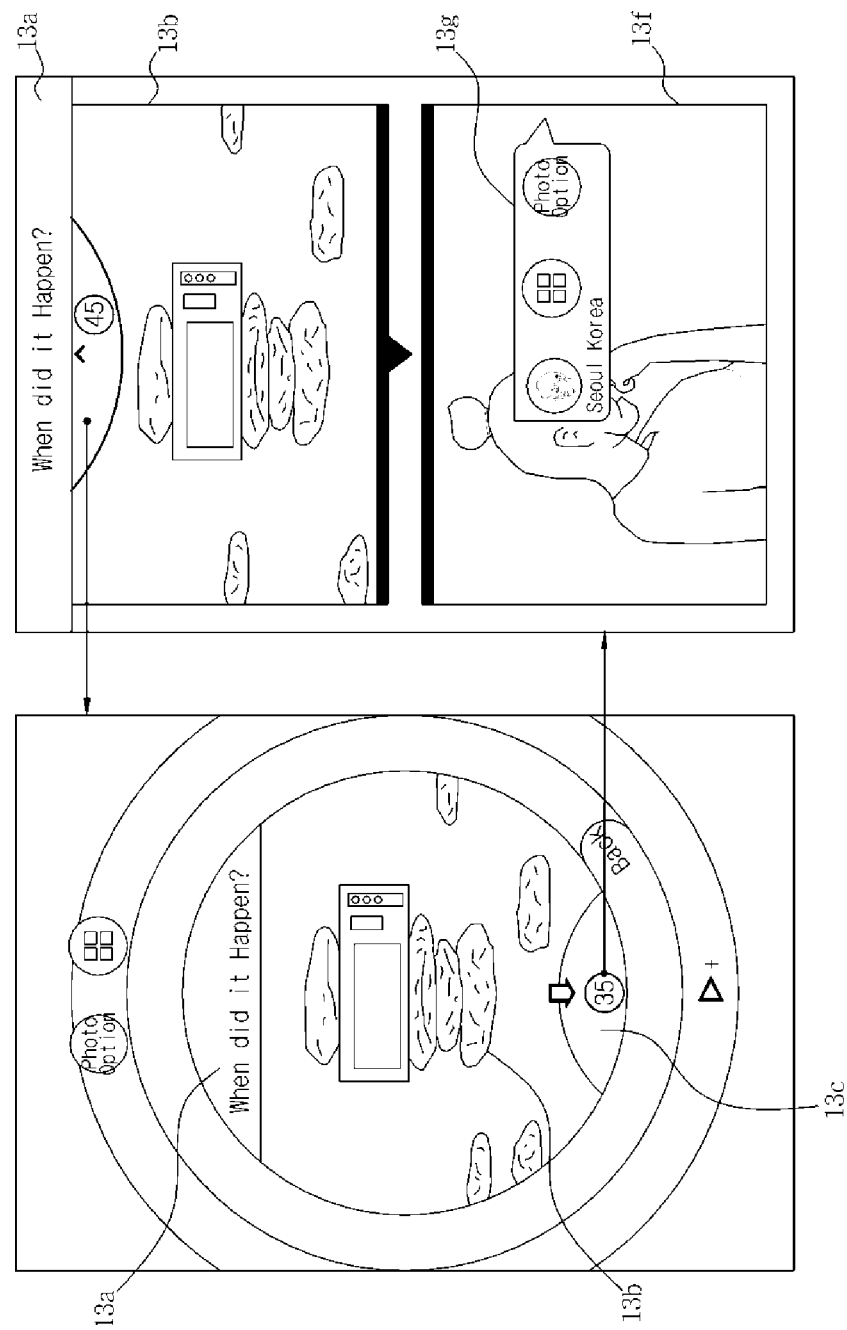
FIG. 15 is a UI screen showing a servicing method in a create mode of a game servicing method of FIG. 3

Hereinafter, a service providing method in a create mode will be described in detail with reference to FIG. 5, in which UI screens related to a create mode are shown in FIG. 15

First, the game service apparatus receives an instruction having a specific theme from a user after entering a create mode (S141).

Thereafter, if it is verified that there is a related image in a terminal, the game service apparatus retrieves the related image from pre-stored data, and registers the related image corresponding to the instruction (S142 and S144).

In addition, if photography of a related image is requested by a user, the game service apparatus verifies that the related image is not in the terminal, performs the photography, and registers the photographed image together with the corresponding instruction (S143 and S144).

Thereafter, as shown in a UI screen of FIG. 15, the game service apparatus displays an instruction 13a and a related image 13b, which are registered, and if images are linked to the registered instruction 13a, displays the number of linked images 13c, and if a view of linked images is requested, displays the linked images 13f in chronological order as shown in the right portion of the UI screen. Reference numeral 13g denotes a select button for a creator, which is generated in the form of a pop-up on all the selectable images in addition to a user's own related image registered by the user, and used when a creator selects an image or another function.

Thereafter, the game service apparatus may select the most similar image or the most interesting image among the linked images as a best popster when a predetermined number of images are linked or after a deadline for participation. The selection process is performed using the select button 13g shown in FIG. 15, in which only the top user or several users ranked behind the top user may be selected as the best popster.

Thereafter, the game service apparatus provides the selected best popster with a reward (S147).

Figure 6:
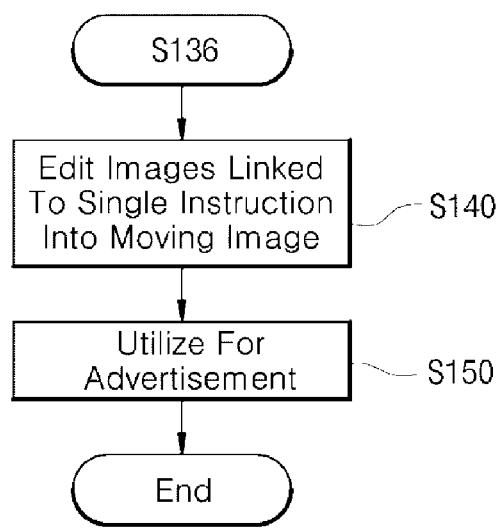
FIG. 6 is a flowchart showing a method of providing a moving image editing service in a game servicing method according to an embodiment of the present invention.

FIG. 6 is a flowchart showing a method of providing a moving image editing service in a game servicing method according to an embodiment of the present invention.

A moving image editing service is a function added to the whole game service, and is configured to edit images of participation with respect to each instruction through the play mode (see S120 and S130 of FIG. 3) into a moving image.

First, the game service apparatus collects images linked to each instruction to edit the collected images into a moving image, if more than a predetermined number of images are collected with respect to a single instruction in the moving image editing unit, or a deadline for participation passes (S140).

Thereafter, the game service apparatus may allow the edited moving image to be provided for a specific advertisement (S150).

Figure 7:
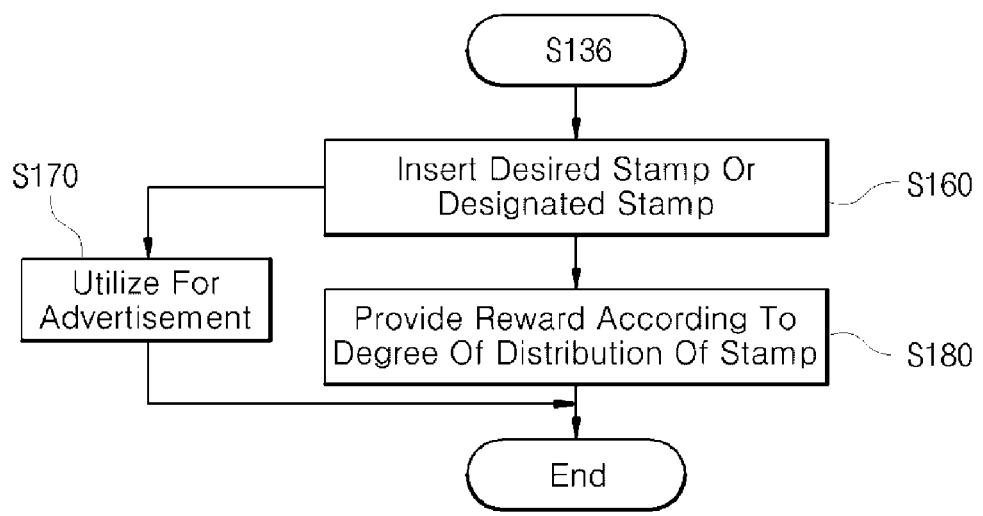
FIG. 7 is a flowchart showing a method of providing an advertisement service using a stamp in a game servicing method according to an embodiment of the present invention.

FIG. 7 is a flowchart showing a method of providing an advertisement service using a stamp in a game servicing method according to an embodiment of the present invention.

Referring to FIG. 7, when an image is registered or linked in a create mode or a play mode, the game service apparatus may insert a stamp into the image and show the image having the stamp inserted (S160). The stamp is inserted upon registration or linking of an image, and in detail, may be inserted immediately before the image is photographed for registration or linking, or immediately before a photographed image or pre-stored image is registered or linked after retrieval. The stamp may include a brand logo, an item image (an emoticon) based on an actual product, and a text phrase for a campaign or promotion, and may be variously selected depending on the intention of a creator or player.

Thereafter, the game service apparatus may utilize the image having a stamp inserted therein for a campaign or an open PPL, and also provide an actual reward associated with the stamp according to the degree of use of the stamp (S170 and S180).

For example, for a campaign advocating to 'save the Earth,' the game service apparatus may suggest inserting an emoticon representing a green environment or inserting the text phrase 'save the Earth' at a designated position of an image. Accordingly, as unspecified people link the image, the advertisement effect of the campaign is maximized. In this case, based on the degree of use or distribution of the stamp, the game service apparatus may reward by providing game points or an actual reward system, such as a badge for a campaign or a participation certificate permitting participation in a campaign.

In addition, when a new product is released by Burger King, the name or an emoticon representing the new product may be provided to be inserted as a stamp, and based on the use of the stamp, a sampling coupon or a discount coupon for the new product is provided as an actual reward.

Various types of stamp information may be previously stored in the game service apparatus, newly registered by a user, or retrieved from the outside to be used as stamps without change.

In addition, the stamp inserting function may be set such that each user selects a desired stamp each time he or she participates, or such that a designated stamp is inserted into an image linked to an instruction registered by a creator.

Figure 8:
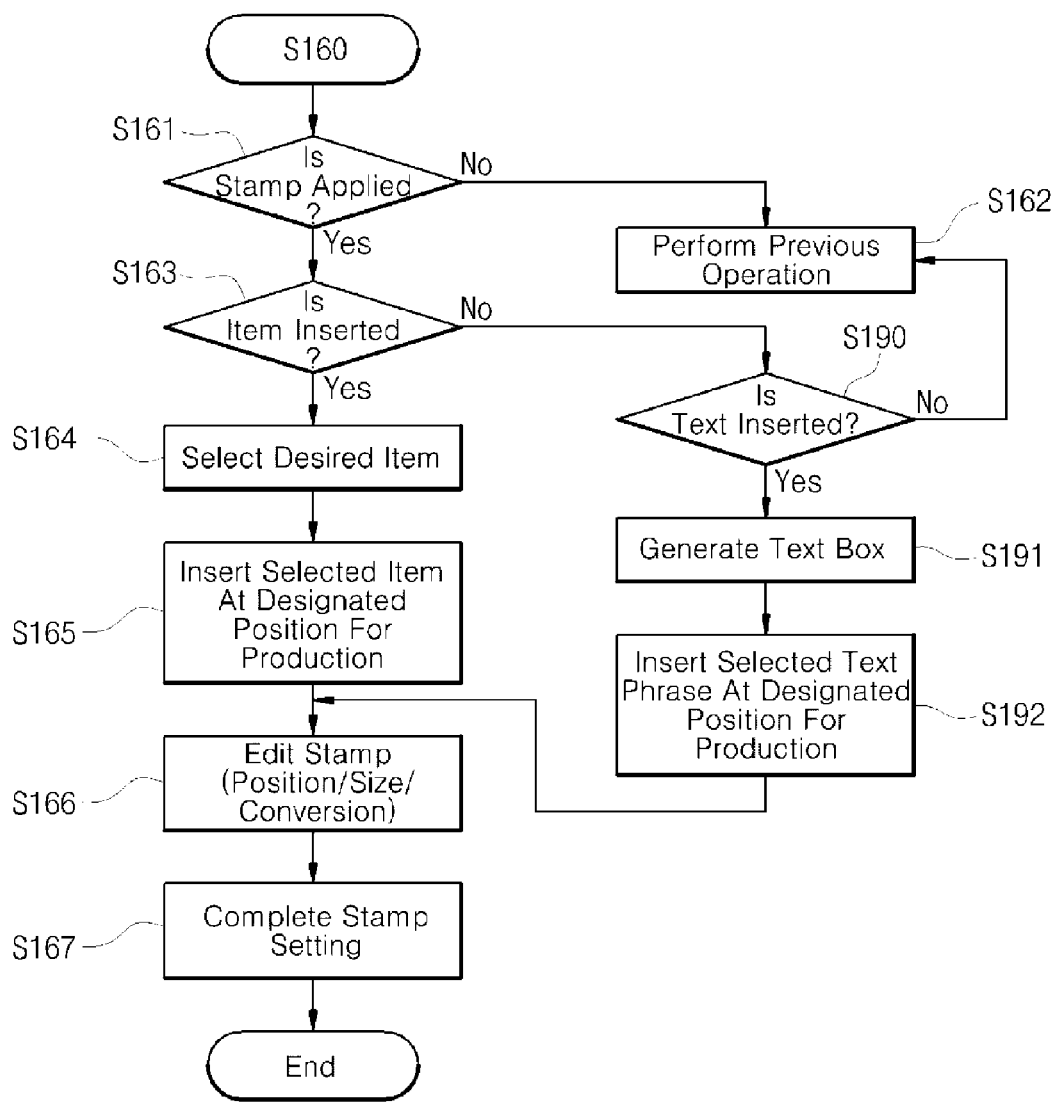
FIG. 8 is a flowchart specifically showing a method of inserting a stamp in a game servicing method according to an embodiment of the present invention.

FIG. 8 is a flowchart specifically showing a method of inserting a stamp in a game servicing method according to an embodiment of the present invention.

First, the game service apparatus determines whether to apply a stamp depending on whether a request for inserting a stamp is made by a user (S161).

If a request for inserting a stamp is not input, the game service apparatus performs the previous operation (S162).

If a request for inserting a stamp is input, the game service apparatus guides a user to select whether to insert an item or insert text as a stamp (S163 and S190).

Figure 16A:
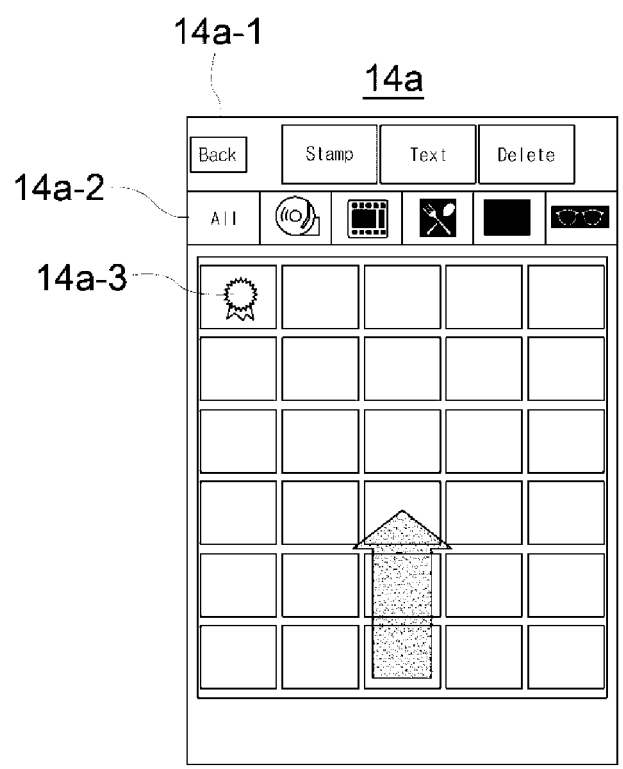
FIGS. 16A and 16B are views illustrating an example of utilization of a stamp according to an embodiment of the present invention.

If a user selects an item, the game service apparatus displays pre-stored stamp information as shown in the screen of FIG. 16A, and receives an input selecting a desired item among the displayed stamp information (S164).

Reference numeral 14a-1 on a stamp screen 14a of FIG. 16A denotes an area in which a title of a stamp is provided and a back button allowing the user to return to a previous screen is displayed. Reference numeral 14a-2 denotes a category bar displaying items according to categories, and 'all' denotes a function of displaying all item information in order of most recent or most popular, regardless of category. Reference numeral 14a-3 denotes an area in which item information is displayed as an image.

Thereafter, the game service apparatus inserts the item selected by the user at a designated position of the image, and produces the image having the item inserted therein (S165).

Thereafter, the game service apparatus may provide an editing function for the inserted item, such as selecting a position, a size and other items.

Figure 16B:
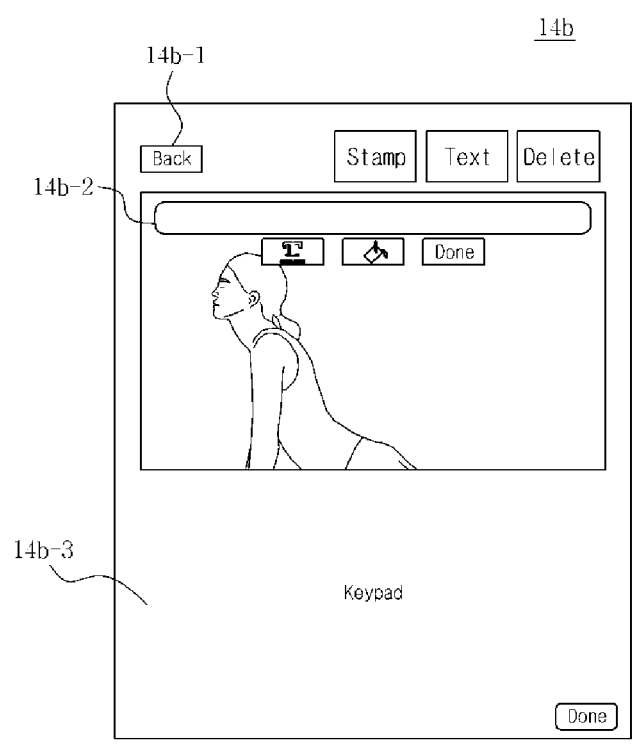

If a user selects text to be inserted, the game service apparatus generates a text box 14b-2 as shown in a screen 14b of FIG. 16B, and allows a sentence or a word to be input into the text box 14b-2 (S191).

The input may be performed through a key pad 14b-3 generated on a screen at the same time at which the text box 14b-2 is generated, and desired text or symbols may be input using the key pad. Reference numeral 14b-1 on the screen 14b of FIG. 16B denotes an area in which a title of text is provided and a back button allowing the user to return to a previous screen is displayed.

Thereafter, the game service apparatus inserts the input text at a designated position of the image, and produces the image having the text inserted therein (S192).

Thereafter, the inserted text is subjected to an editing process, such as editing a position and a size, thereby completing a stamp setting (S167).

Meanwhile, a method of extracting and compositing an image according to the present invention is implemented in a software program, and recorded in a predetermined computer readable recording medium.

For example, the recording medium may include an internal recording medium, such as a hard disk device, a flash memory, a random access memory (RAM), a read-only memory (ROM), and an external recording medium, such as an optical disc device, for example, CD-R and CD-RW, a compact flash card, a smart media, a memory stick and a multimedia card.

In this case, a program recorded in a computer readable recording medium may execute a game service providing method including: authenticating a user authentication through a member login; guiding the authenticated user to select one of a play mode and a create mode prior to execution of a game; allowing the user to register an instruction having a specific theme and a related image; allowing the user to select an instruction with respect to which he or she will participate among user-specific instructions and user-specific related images that are designated in the create mode; and linking a similar image with respect to the selected instruction.

The program for the game service may be provided in the form of an application. An application server may store and manage the application for a game service in an application server, and upon a request from a client terminal, transmit the application to the client terminal. The client terminal downloads and installs the application and executes the downloaded application. Upon execution of the application, the client terminal operates as a game service apparatus such that an instruction having a desired theme and a related image are registered to induce other users to participate with respect to the instruction, or similar images with respect to instructions registered by other users are linked, thereby implementing a real-time flash-mob between different users.

The computer program (known as a program, software, a software application, script or codes) may be written in any form of program languages including a compiled language, an interpreted language, a transcendental language, or a procedural language, and may be developed in any form including an independent program or a module, component, subroutine, or any other unit suitable for use in a computer environment. The computer program does not necessarily correspond to a file of a file system. The program may be stored in a single file provided to a requested program, in multiple interoperating files (for example, files each storing some of one or more modules, lower level programs, or codes) or in a part of a file containing other programs or data (for example, one or more scripts stored in a markup language document). The computer program may be located on a single site or over a plurality of sites in a distributed fashion and developed so as to be executed on multiple computers connected to one another through a communication network or on a single computer.

Examples of a computer readable medium suitable for storing the computer program instruction and data include a semiconductor memory device including an erasable programmable read-only memory (EPROM), an electrically erasable programmable read-only memory (EEPROM), and a flash memory device, and all non-volatile memories, media and memory devices including a magnetic disk, such as an internal hard disk or an external disk, a magneto-optical disc, and CD-ROMs and DVD-ROMs. A processor and a memory may be supplemented by a specific purpose logic circuit or integrated into a specific purpose logic circuit.

The functional operations and the embodiments described in the specification may be implemented in digital electronic circuits, computer software, firmware, or hardware, or implemented in combinations of one or more of these. The embodiments of the subject matter described in the specification may be embodied as one or more computer program products, that is, one or more modules related to a computer program instruction encoded on a program storage medium to control an operation of a data processing apparatus or to be run by the operation. The computer readable medium may be a machine readable storage device, a machine readable storage board, a memory device, a composition of material having exertion on an electric waveform signal readable by a machine, or a combination of one or more of these.

The embodiments of the subject matter described in the specification may be implemented in an operation system including a back-end component, such as a data server, a middleware component, such as an application server, a front-end component, such as a client computer having a web browser or a graphic user interface interoperable with the embodiments of the subject matter described in the specification, or a combination of one or more of the back-end component, the middleware component, and the front-end component. The components of the system may allow interconnection in any form and through any medium of digital data communication, such as a communication network.

Even though the operations are described in a certain order on the drawings, this does not imply that the operations need be executed in the certain order or in a sequential order, or that all the operations need be executed in order to obtain desired results. In some cases, multitasking and parallel processing may be beneficial.

Embodiments of the subject matter have been described in the specification. Other embodiments are within the scope of the following claims. For example, suitable results may be achieved even if operations cited in the claims are performed in a different order.

The above description suggests the present invention to provide an example that explains the present invention and accordingly, it will be apparent to those skilled in the art that various modifications, changes, and variations may be made in the example without departing from the scope of the invention. Accordingly, embodiments disclosed herein should not be construed as limiting the present invention. The scope of the present invention should be defined not by the embodiments but by the claims, and it should be construed that all technologies equivalent in scope thereto are included in the scope of the present invention.

INDUSTRIAL APPLICABILITY

The present invention relates to a system and method for servicing a user-participation type game, and more particularly, to a system and method for servicing a user-participation type game capable of increasing interest of participants and contributing to development of the game industry by dividing a game mode into a create mode and a play mode such that each user suggests an instruction having a specific theme and a related image in the create mode, and in the play mode, each user links a similar image with respect to the instruction and related image suggested in the create mode, so that an online flash-mob is implemented.

The invention claimed is:

1. An apparatus for servicing a user-participation type game utilizing a real-time flash-mob, the apparatus comprising:
    a processor configured to
        provide selections to select a create mode or a play mode prior to execution of a game service,
        when the create mode is selected, register, based on a user input, an instruction having a specific theme and a related image for the instruction, and
        when the play mode is selected, link a similar image to the registered instruction so as to implement the real-time flash-mob; and
    an image acquiring device configured to, when image photography is requested by the processor in the create mode or the play mode, acquire an image of an object for causing the processor to register the acquired image as the related image in the create mode or link the acquired image as the similar image in the play mode,
wherein the processor is configured to select, based on the user input, a stamp from among stamp information including a thumbnail image based on an actual product,
insert the selected stamp into a designated position of the acquired image, and
register the acquired image including the inserted stamp as the related image or the similar image.

2. The apparatus of claim 1, wherein the processor is configured to
collect, via a network, images linked by other players with respect to the registered instruction, and
edit the collected images into a moving image.

3. The apparatus of claim 1, wherein the processor is configured to
select a creator having a large number of images linked with respect to the registered instruction, or a player having a large number of links with respect to the registered instruction through the play mode, and
provide the selected creator or player with a reward.

4. The apparatus of claim 1, wherein the processor is configured to provide a reward associated with the inserted stamp based on a frequency of use of the inserted stamp.

5. The apparatus of claim 1, wherein the processor is configured to perform a user authentication based on authorization information about members registered in the game service.

6. A method of servicing a user-participation type game using a real-time flash-mob, the method performed by a game service apparatus comprising a processor and a memory, the method comprising:
performing, by the processor, user authentication through membership login;
providing, by the processor, selections of a play mode and a create mode to a user;
selecting, by the processor, one among the play mode and the create mode prior to execution of a game based on an user input for the selections of the play mode and the create mode,
when the create mode is selected, performing, by the processor, the create mode for registering, from the user, an instruction having a specific theme and a related image; and
when the play mode is selected, performing, by the processor, the play mode comprising
receiving, based on the user input, a selected instruction among instructions registered in the create mode,
acquiring a similar image with respect to the selected instruction, and
linking the acquired similar image to the selected instruction, wherein the performing the create mode or the performing the play mode comprises
inserting, by the processor, a stamp, selected from among stamp information including a thumbnail image based on an actual product, into a designated position of the registered image or the linked similar image, and
registering, by the processor, the inserted image having the inserted stamp as the related image or link the inserted image as the similar image and storing the registered image into the memory.

7. The method of claim 6, the method further comprises providing, by the processor, a reward associated with the inserted stamp based on a frequency of use of the inserted stamp.

8. The method of claim 6, further comprising:
collecting, by the processor and via a network, images linked by other players with respect registered instruction through the play mode;
editing, by the processor, the collected images into a moving image; and
displaying, by the processor, the moving image on a display.

9. The method of claim 6, further comprising:
selecting, by the processor, a creator having a large number of images linked with respect to the selected instruction, or a player having a large number of links with respect to the selected instruction; and
providing the selected creator or player with a reward.

10. The method of claim 6, wherein the performing the create mode comprises:
receiving, by the processor, the instruction having the specific theme from the user;
receiving, by the processor, a selection regarding whether to perform photography related to the selected instruction;
acquiring, by the processor, an image related to the selected instruction through the photography or from pre-stored data stored in the memory, and registering the acquired image for the selected instruction; and
arranging and displaying, by the processor, acquired images with respect to the selected instruction in chronological order on a display.

11. The method of claim 6, wherein the performing the play mode comprises:
receiving, based on the user input, the selected instruction among the instructions registered in the create mode;
receiving, based on the user input, an input regarding whether to acquire the similar image with respect to the selected instruction; and
acquiring, the similar image corresponding to the selected instruction through the photography or from pre-stored data stored in the memory, and uploading the acquired image on the game so as to implement the real-time flash-mob.

* * * * *